United States Patent [19]

Shotmeyer

[11] 3,906,794

[45] *Sept. 23, 1975

[54] DEVICE TO INDICATE THE CONTENTS IN AN UNDERGROUND LIQUID CONTAINING TANK

[76] Inventor: Albert Shotmeyer, c/o Shotmeyer Oil & Chemical Co., One Valley St., Hawthorne, N.J. 07506

[ * ] Notice: The portion of the term of this patent subsequent to Mar. 25, 1992, has been disclaimed.

[22] Filed: Sept. 12, 1973

[21] Appl. No.: 396,577

[52] U.S. Cl. .................................... 73/300; 73/302
[51] Int. Cl.² ......................................... G01F 23/16
[58] Field of Search ..................... 73/299, 300, 302

[56] References Cited
UNITED STATES PATENTS

| | | | |
|---|---|---|---|
| 1,250,056 | 12/1917 | Walker | 73/299 |
| 1,289,755 | 12/1918 | Haynes | 73/300 |
| 2,674,881 | 4/1954 | Rich | 73/300 |
| 3,319,571 | 5/1967 | Schaeffer | 73/299 |

FOREIGN PATENTS OR APPLICATIONS

| | | | |
|---|---|---|---|
| 839,749 | 12/1937 | France | 73/299 |

Primary Examiner—Richard C. Queisser
Assistant Examiner—John S. Appleman
Attorney, Agent, or Firm—Harry N. Schofer

[57] ABSTRACT

A flexible container, in which a flexible partition divides the interior into a pair of airtight and watertight chambers, is provided with a pair of tubular conduits, one connecting with each chamber. The container, in its collapsed state, is forced into the liquid fuel or other liquid containing tank through a hole formed in the side wall of the vent pipe. Water or any other heavy liquid, or particulate matter such as shot or pebbles, is delivered through one of the tubular conduits which extends through the hole in the vent pipe, to sink the container to the bottom of the liquid in the tank. A pressure gauge, calibrated in gallons for that particular tank, is attached to the outer end of the other tubular conduit. Air, or some other gas, is pumped into the tubular conduit to which the gauge is attached until the reading on the gauge corresponds to the known contents of the liquid in the underground tank.

7 Claims, 5 Drawing Figures

US Patent  Sept. 23,1975  3,906,794

DEVICE TO INDICATE THE CONTENTS IN AN UNDERGROUND LIQUID CONTAINING TANK

BACKGROUND OF THE INVENTION

1. Field of the Invention

This invention relates to liquid level indicators, and more particularly to a device to be applied to an existing liquid containing underground tank, for instance, a liquid fuel containing tank, to readily indicate the contents in said tank.

2. Description of the Prior Art

Various means have been used and proposed to visibly indicate the contents in a remotely positioned liquid containing tank, such as an underground liquid fuel containing tank. The most common means involves the use of a calibrated stick which is lowered through the fill pipe to the bottom of the tank. This provides a reliable reading, but is time consuming, and the removal of the fill cap permits the undesirable admission of dirt, water, and moisture laden air into the tank.

Another means involves the use of a pressure sensing means, such as a gas or liquid containing flexible member within the tank, and a conduit passing through a wall of the tank to a pressure indicating means positioned at a convenient point above the ground surface. Such a device requires the drilling of a hole in the tank, which is usually performed before the tank is buried. It is not practical or safe to install such a device in existing underground tanks because of the inconvenience in excavating the paving and earth above the tank, and the danger of creating a spark while drilling a hole in the tank to accommodate the parts that must go into the tank. Nor is it practical to drill a hole in the fill cap, as the conduit would constantly be in the way during filling operations.

SUMMARY OF THE INVENTION

It is an object of this invention to provide a novel device for indicating the contents in an underground liquid containing tank which can readily be installed in an existing underground tank which is not subject to the above listed inconveniences and hazards.

It is a further object of this invention to provide a novel device for indicating the contents in an existing underground liquid fuel containing tank which can readily be inserted through a hole formed in the side wall of the usual vent pipe.

It is a still further object of this invention to provide a novel device for indicating the contents of an underground liquid fuel containing tank which is economical to manufacture, reliable in operation, and requires no skilled operations in its installation.

In a preferred form of the invention, the device comprises a generally elongated flexible container, such as one made from plastic or rubber that will not chemically react with the liquid contents in the tank. A flexible partition divides the container into two roughly equal volume chambers, and a separate tubular conduit is connected at one end to each chamber. At a convenient height above the ground surface level, a hole is cut through the side wall of the vent pipe, large enough to allow the passage of the container and the two conduits. The container is forced down the vent pipe and into the tank either by pushing downwardly on the conduits, or by a blast of compressed air.

The other ends of the conduits, that is, the ends opposite to those attached to the chambers of the container, extend through the hole in the vent pipe. The outer end of one conduit is left open, or may have a valve therein. A pressure gauge, calibrated in gallons for the particular tank to which it is connected, is attached to the outer end of the other conduit, which conduit also has a branch duct having an outwardly closing check valve therein.

When the container has been deposited within the tank, a small quantity of air is pumped into one chamber through the check valve. A liquid having a density greater than that of the liquid fuel in the tank, or particulate matter such as shot or pebbles, is admitted into the other chamber through the outer end of the conduit connected therewith, causing the container to sink to the bottom of the tank. Thereupon, additional air is pumped into the air containing chamber until the reading on the gauge corresponds to the contents in gallons within the tank, which could have previously been determined by the stick method.

As used herein, the term "flexible" as applied to the walls and partition of the container, has reference to a construction wherein the walls and partition are made from a material, such as a thin plastic or rubber, and of such thickness, as to be easily deformable by slight pressure, and which can easily be crumpled.

BRIEF DESCRIPTION OF THE DRAWING

For a clearer understanding of the invention and its operation, reference is made to the detailed description which follows, and to the annexed drawings, in which:

Referring to FIGS. 1 and 2, illustrating a first preferred embodiment, the numeral 10 designates an underground liquid fuel containing tank buried below the surface of the overlying earth or paving 12. A fill pipe 14 extends from an opening in the tank 10 to a point slightly below the surface of the earth or paving 12 where it is covered by a removable fill cap 16 the upper surface of which is flush with the surrounding surface of the earth or paving 12. The tank also includes a dispensing pipe 18, the lower end of which is disposed about two inches from the bottom of the tank to prevent the withdrawal of water that collects in the bottom of the tank, and an upstanding vent pipe 20 carrying, as its open upper end, a protective cap 22.

Figure 2:
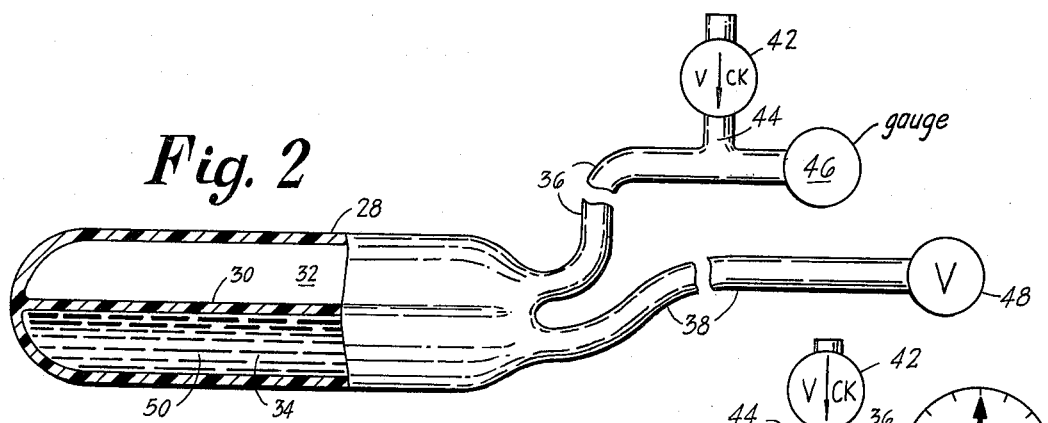
FIG. 2 is an enlarged illustration of the invention of FIG. 1 with the container shown partly in section.
Figure 3:
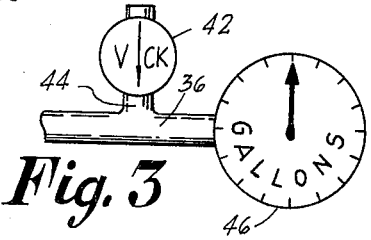
FIG. 3 is an enlarged illustration of the check valve and contents indicating means of FIG. 2.

A body of liquid fuel 24 is shown within the tank 10, overlying a quantity of water 26.

In installations of this type, the collection of some water within the tank is inevitable, and being heavier than the liquid fuel, it settles at the bottom of the tank.

The invention comprises a device which can be easily and readily installed within an existing underground liquid fuel containing tank to visibly indicate the contents therein, and comprises a container 28 made from a flexible material, such as plastic or rubber, having a partition 30 extending transversely thereof dividing the interior into a first or upper chamber 32 and a second or lower chamber 34, the walls of the container and the partition being imperforated to form the airtight and water tight chambers 32 and 34.

A first elongated tubular conduit 36 is connected at one of its ends to an end of the first or upper chamber 32, and a second elongated tubular conduit 38 is connected at one of its ends to an end of the second or lower chamber 34, both conduits 36 and 38 extending upwardly through the tank 10 and the vent pipe 20 and through an opening in a side wall of the vent pipe 20, the opening being formed at a point a few feet above the surface of the ground or paving 12.

A check valve 42 is attached to a branch duct 44 connecting with the tubular conduit 36 near the outer end of the latter, and a pressure gauge 146, calibrated in gallons, is attached to the outer end of said tubular conduit 36. The outer end of the tubular conduit 38 receives a valve 48.

The opening 40 is formed in a side wall of the vent pipe 20 in any well known manner, as by drilling, sawing, grinding, or by means of a blow torch. Reference is made to my copending application entitled Combined Water Removing and Contents Indicating Device For Underground Liquid Fuel Containing Tanks and a Method of Installing Same in Existing Tanks, Ser. No. 396,575, now U.S. Pat. No. 3,872,886 filed concurrently herewith, outlining a method of forming an opening in the side wall of a vent pipe. After the hole is formed, the container 28, in its collapsed state and with the tubular conduits 36 and 38 connected therewith as shown, is passed through the opening 40 and into the upstanding vent pipe 20. In its collapsed state, the container 28 can easily enter the hole or opening 40 and the vent pipe, the latter being about 2 inches internal diameter, and the opening about 1½ inches diameter. The container can be pushed into the tank by applying pressure to the tubular conduits 36 and 38, or by applying a blast of compressed air into the vent pipe above the container.

Figure 1:
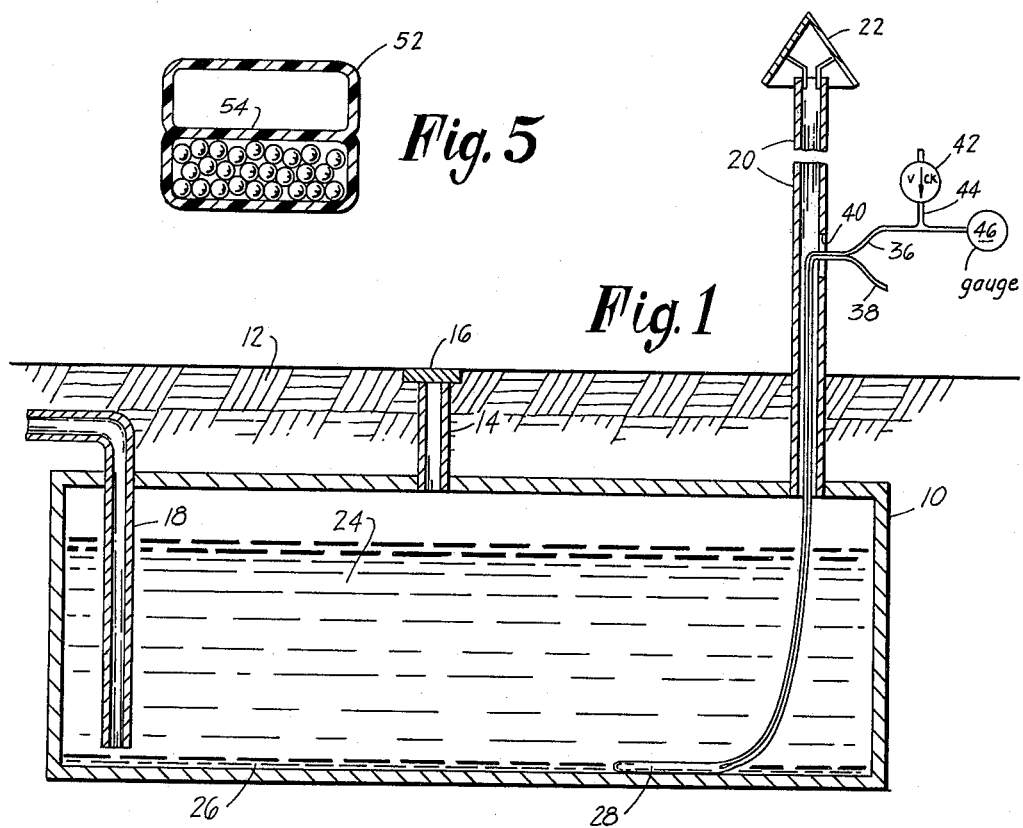
FIG. 1 is a schematic illustration of an underground liquid fuel containing tank showing a first embodiment of the invention in place.

The tubular conduits 36 and 38 should obviously be long enough to permit the container 28 to sink to the bottom of the tank 10 with the outer ends of the conduits extending through the opening 40 as shown in FIG. 1. A small quantity of compressed air is delivered through the check valve 42, tubular conduit 36, and into the upper chamber 32 to inflate the latter. A quantity of liquid 50, which may be water or a substance heavier than water, is then delivered through the tubular conduit 38 into the lower chamber 34, causing the container to sink to the bottom of the tank 10 with the chamber 32 uppermost as shown. Having measured the contents of the fuel within the tank 10, additional compressed air is then fed through the check valve 42 until the reading on the calibrated gauge 46 corresponds with the actual liquid contents within the tank.

It is evident that a different calibrated gauge 46 must be used for tanks having different sizes and/or shapes.

Figure 4:
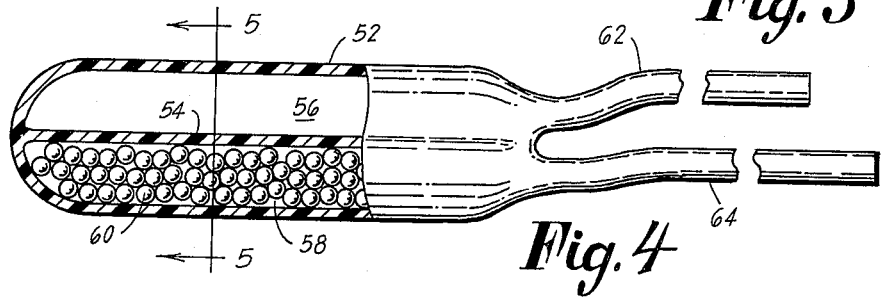
FIG. 4 is an illustration, partly in section, of a second embodiment of the invention.
Figure 5:
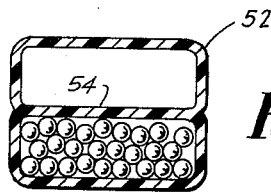
FIG. 5 is a cross sectional view taken on the line 5—5 of FIG. 4.

A second preferred embodiment of the invention is illustrated in FIGS. 4 and 5, in which the lower chamber is filled, or partly filled, with a particulate matter instead of a liquid.

In this embodiment of the invention the container is designated by the numeral 52 and comprises a flexible member made from a soft plastic material or rubber, having a central transverse partition 54 dividing the interior into a first or upper chamber 56 and a second or lower chamber 58, the lower chamber being filled or partially filled with a particulate matter 60 such as shot or round pebbles. As in the first embodiment, the chambers 56 and 58 are airtight and watertight. One end of a first elongated tubular conduit 62 is attached to one end of the upper chamber 56 and one end of a second elongated tubular conduit 64 is attached to one end of the lower chamber 58, the other ends of the tubular conduits 62 and 64 passing upwardly through the tank and upstanding vent pipe and through an opening in the side wall of the vent pipe as in the preceding embodiment. A gauge, calibrated in gallons, is attached to the tubular conduit 62, said conduit having a branch duct and a check valve therein as in the embodiment shown in FIG. 2.

The container 52 is installed within an existing tank in the same manner as described above, and shot or pebbles are delivered through the tubular conduit 62 to sink the container to the bottom of the liquid fuel within the tank. Obviously, the shot or pebbles must be smaller than the internal diameter of the tubular conduit 64.

I claim:

1. A device adapted to be immersed within an underground liquid containing tank to indicate the liquid contents therein comprising: a container structurally independent of the walls of the tank in which it is adapted to be immersed, the walls of the container being flexible and impervious to the passage of fluids; a flexible and impervious partition dividing said container into a first imperforated chamber and a second imperforated chamber; a first tubular conduit, one end of said first tubular conduit being connected with said first chamber; pressure responsive indicating means connected with the other end of said first tubular conduit, said first tubular conduit and said first chamber containing a hydrostatic fluid; and a second tubular conduit, one end of said second tubular conduit connected with said second chamber; both of said chambers, except for said connections with said tubular conduits, being airtight and watertight as to the liquid in which the container may be immersed.

2. A device to indicate the liquid contents in an underground tank as defined in claim 1, in which said container and partition are made from a plastic material.

3. A device to indicate the liquid contents in an underground tank as defined in claim 1, in which said second chamber contains a material having a specific gravity greater than that of the liquid within the tank.

4. A device to indicate the liquid contents in an underground tank as defined in claim 3, in which said material is a particulate matter.

5. A device to indicate the liquid contents in an underground tank as defined in claim 4, in which the cross sectional dimension of said second tubular conduit is greater than the cross sectional dimension of said particulate matter.

6. A device to indicate the liquid contents in an underground tank as defined in claim 1, in combination with a tank, said tank having an upstanding vent pipe, an opening in the wall of said vent pipe, the other ends of said tubular conduits extending through said opening.

7. A device to indicate the liquid contents in an underground tank as defined in claim 6, in which the cross sectional dimension of said container, in its distended state, is greater than the cross sectional dimension of said opening and said vent pipe, and in its deflated state the container has a cross sectional dimension less than the cross sectional dimension of said opening and said vent pipe, whereby the container may be inserted into the tank through said opening in the vent pipe.

* * * * *